Patented Jan. 5, 1954

2,665,291

UNITED STATES PATENT OFFICE 2,665,291

METAL XANTHATES OF THE HALO-ARYLOXYALKANOLS

Bryant Charles Fischback, Walnut Creek, Calif., assignor to The Dow Chemical Company, Midland, Mich., a corporation of Delaware No Drawing. Application June 29, 1951, Serial No. 234,449

10 Claims. (Cl. 260—455)

The present invention is concerned with xanthates and is particularly directed to the metal xanthates of the haloaryloxyalkanols. These latter compounds are for the most part crystalline solids, somewhat soluble in acetone and water and relatively insoluble in aliphatic hydrocarbons and ether. The new compounds are useful as intermediates for the preparation of more complex organic materials and as active constituents of plant growth control compositions, e. g. herbicidal mixtures.

The new xanthate compounds may be prepared by reacting together (1) a haloaryloxyalkanol, (2) a suitable metal hydroxide e. g. sodium hydroxide, calcium hydroxide or potassium hydroxide, and (3) carbon bisulfide. The reaction is conveniently carried out in an inert organic solvent in which the desired xanthate product is insoluble and preferably in a low boiling solvent such as ether or normal pentane. Good results are obtained when substantially equimolecular proportions of the reactants are employed.

In the foregoing method, the haloaryloxyalkanol and carbon bisulfide may be dispersed in the reaction solvent and the metal hydroxide added portionwise thereto with stirring. The reaction is somewhat exothermic and takes place smoothly at the temperature range of from about 20° to 40° C. The temperature may be controlled by regulation of the rate contacting the reactants as well as by the addition and subtraction of heat, if required. In practice, it is oftentimes convenient to operate at the boiling temperature of the reaction mixture and under reflux. Upon completion of the reaction, the reaction product may be separated by conventional methods, e. g. filtration or decantation.

Optionally, the metal hydroxide may be added portionwise with stirring to a solvent dispersion of the haloaryloxyalkanol. The carbon bisulfide is then added portionwise with stirring to the above mixture. The conditions of reaction and methods of separation are essentially as previously described.

In an alternative procedure, a readily water soluble metal xanthate compound, as obtained in accordance with the foregoing paragraphs, may be dispersed in a minimum amount of water and the resulting solution reacted with a concentrated aqueous solution of a molecular excess of a water soluble alkaline earth metal or heavy metal salt, e. g. barium acetate, zinc chloride, copper sulfate, aluminum acetate, etc. The desired alkaline earth metal or heavy metal xanthate compound is recovered from the reaction mixture in any suitable fashion, e. g. by concentrating to a small volume and filtration or decantation, or by simple filtration where the desired product spontaneously precipitates in the course of the reaction.

The following examples illustrate the invention and are not to be construed as limiting the same:

Example 1

103.5 grams (0.5 mole) of 2-(2,4-dichlorophenoxy)ethanol, 41.9 grams (0.55 mole) of carbon bisulfide and 2900 milliliters of anhydrous diethyl ether were placed in a reactor provided with a stirrer and a Dry-Ice cooled condenser. With the stirrer operating, 15.5 grams of powdered 90 per cent potassium hydroxide (equivalent to 0.25 mole of KOH) was added to the above mixture. Five minutes later an additional 0.25 mole of potassium hydroxide was added to the mixture and stirring thereafter continued for about three hours. The reaction mixture was then filtered and the residue washed with diethyl ether and dried to obtain a crude potassium 2-(2,4-dichlorophenoxy)ethylxanthate product as a crystalline solid. The latter product was dissolved in acetone and the acetone solution filtered. The filtrate was then diluted with a sufficient amount of diethyl ether to precipitate the potassium 2-(2,4-dichlorophenoxy)ethylxanthate product as light yellow crystals having a decomposition point of 176°–178° C. and a chlorine content of 22.25 per cent and a sulfur content of 20.1 per cent as compared to a theoretical chlorine and sulfur content of 22.1 per cent and 20.0 per cent, respectively.

Example 2

20.7 grams (0.1 mole) of 2-(2,4-dichlorophenoxy)ethanol, 8.4 grams (0.11 mole) of carbon disulfide and 240 milliliters of normal pentane were placed in a reactor provided with a stirrer and condenser. With the stirrer operating, 6.2 grams of powdered 90 per cent potassium hydroxide (equivalent to 0.1 mole KOH) was added to the above mixture. Stirring was then continued over a period of about 3 hours, and the residue washed with normal pentane and dried. As a result of these operations, a potassium 2-(2,4-dichlorophenoxy)ethylxanthate product was obtained as a crystalline solid.

Example 3

186 grams (1.0 mole) of 1-(4-chlorophenoxy)-2-propanol, 76 grams (1 mole) of carbon bisulfide and about 2000 milliliters of anhydrous diethyl ether were placed in a reactor provided with a stirrer and a Dry-Ice cooled condenser. With stirrer operating, 56 grams (1 mole) of powdered potassium hydroxide was added to the above mixture. Stirring was then continued for about 3 hours, and the reaction mixture thereafter filtered and the residue dried. As a result of these operations, a potassium 1-(4-chlorophenoxy)-2-propylxanthate product was obtained as a crystalline solid melting at 218°–222° C. and having a sulfur content of 21.50 per cent and a chlorine content of 11.95 per cent as compared to a theoretical sulfur and chlorine content of 21.31 per cent and 11.78 per cent, respectively.

Example 4

In an exactly analogous fashion, 1 mole quantities of 1-(4-chloro-2-methylphenoxy)-2-propanol, carbon bisulfide and powdered potassium hydroxide were reacted together in diethyl ether to obtain a potassium 1-(4-chloro-2-methylphenoxy)-2-propylxanthate product as a crystalline solid. The latter had a melting point of 193°–195° C. and a chlorine content of 11.08 per cent and a sulfur content of 20.5 per cent as compared to a theoretical chlorine and sulfur content of 11.26 per cent and 20.4 per cent, respectively.

Example 5

1 mole quantities of 1-(2,4,5-trichlorophenoxy)-2-propanol, carbon bisulfide and powdered potassium hydroxide were reacted together in diethyl ether as described in Example 3 to obtain a potassium 1-(2,4,5-trichlorophenoxy)-2-propylxanthate product. The latter is a crystalline solid melting at 173°–174° C. and having a chlorine content of 28.60 per cent and a sulfur content of 17.50 per cent as compared to theoretical chlorine and sulfur content of 28.77 per cent and 17.34 per cent, respectively.

Example 6

20.7 grams (0.1 mole) of 2-(2,4-dichlorophenoxy)ethanol, 8.4 grams (0.11 mole) of carbon disulfide and 250 milliliters of normal pentane are placed in a reactor provided with a stirrer and condenser. 4 grams (0.1 mole) of powdered sodium hydroxide is then added portionwise with stirring to the above mixture over a period of 15 minutes. Stirring is then continued for about 3 hours, and the reaction mixture thereafter filtered and the residue dried. As a result of these operations, a sodium 2-(2,4-dichlorophenoxy)ethylxanthate product is obtained as a crystalline solid.

Example 7

In an additional operation, 120.6 grams (0.5 mole) of 2-(2,4,5-trichlorophenoxy)ethanol, 41.9 grams (0.55 mole) of carbon bisulfide and 2000 milliliters of anhydrous diethyl ether are placed in a reactor provided with a stirrer and condenser. 20 grams (0.5 mole) of sodium hydroxide is then added portionwise with stirring to the above mixture over a period of 15 minutes. Stirring is continued for about 2½ hours, and the reaction mixture thereafter filtered and dried to obtain a sodium 2-(2,4,5-trichlorophenoxy)ethylxanthate product as a crystalline solid.

In a similar manner, other metal xanthates of the haloaryloxyalkanols may be prepared of which the following are representative:

Sodium 2-(4-chloro-2-methylphenoxy)ethylxanthate by reacting together 2-(4-chloro-2-methylphenoxy)ethanol, carbon bisulfide and sodium hydroxide.

Calcium 2-(2,4-dibromophenoxy)ethylxanthate by reacting together 2-(2,4-dibromophenoxy)ethanol, carbon bisulfide and calcium hydroxide.

Sodium 1-(2,4,5-trichlorophenoxy)-2-propylxanthate by reacting together 1-(2,4,5-trichlorophenoxy)-2-propanol, carbon bisulfide and sodium hydroxide.

Potassium 2-(pentachlorophenoxy)ethylxanthate by reacting together 2-(pentachlorophenoxy)ethanol, carbon bisulfide and potassium hydroxide.

Calcium 2-(2,4-dichlorophenoxy)ethylxanthate by reacting together 2-(2,4-dichlorophenoxy)ethanol, carbon bisulfide and calcium hydroxide.

Potassium 1-(2-chlorophenoxy)-2-propylxanthate by reacting together 1-(2-chlorophenoxy)-2-propanol, carbon bisulfide and potassium hydroxide.

Sodium 2-(2-chlorophenoxy)ethylxanthate by reacting together 2-(2-chlorophenoxy)ethanol, carbon bisulfide and sodium hydroxide.

Sodium 2-(2-bromo-4-chlorophenoxy)ethylxanthate by reacting together 2-(2-bromo-4-chlorophenoxy)ethanol, carbon bisulfide and sodium hydroxide.

A preferred embodiment of the present invention comprises the novel xanthate compounds of the formula

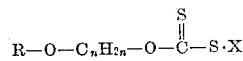

wherein $n$ represents one of the integers 2 and 3, X represents an alkali metal and R represents a chloroaryl radical such as monochlorophenyl, monochlorotolyl, dichlorophenyl and trichlorophenyl.

The haloaryloxyalkanols employed for starting materials as previously described are conveniently prepared by reacting an alkali metal salt of an appropriate phenol with a monohaloaliphatic alcohol such as ethylene chlorohydrin, propylene chlorohydrin, 2-chloro-1-propanol, 3-bromo-1-propanol, 1-chloro-2-propanol, 3-chloro-2-butanol, and 3-chloro-2-pentanol. Representative members of the haloaryloxyalkanols are oils or crystalline solids characterized by the physical properties set forth in the following table:

| Compound | Boiling point | Melting point, °C. |
|---|---|---|
| 2-(2-chlorophenoxy)ethanol | 137° C. at 9 mm. pressure | |
| 2-(4-chlorophenoxy)ethanol | 130°–135° C. at 5 mm. pressure | |
| 2-(4-chloro-2-methylphenoxy)ethanol | | 51 –53 |
| 2-(2,4-dichlorophenoxy)ethanol | 174° C. at 13 mm. pressure | 54 –57.5 |
| 2-(2,4,5-trichlorophenoxy)ethanol | 121°–131° C. at 0.3 mm. pressure | 66.5–68.5 |
| 1-(4-chlorophenoxy)-2-propanol | 145.5°–148.5° C. at 10 mm. pressure | |
| 1-(2-chlorophenoxy)-2-propanol | 141°–149° C. at 10 mm. pressure | |
| 1-(2,4-dichlorophenoxy)-2-propanol | 151°–159° C. at 10 mm. pressure | |
| 1-(4-chloro-2-methylphenoxy)-2-propanol | 135° C. at 0.3 mm. pressure | |
| 1-(2,4,5-trichlorophenoxy)-2-propanol | 150°–155° C. at 2 mm. pressure | 47.8–48.0 |
| 1-(pentachlorophenoxy)-2-propanol | | 64 –66 |
| 2-(4-bromophenoxy)ethanol | 132°–134° C. at 4.6 mm. pressure | 51 –55 |
| 2-(2,4-dibromophenoxy)ethanol | 159°–161° C. at 3 mm. pressure | 59 –60 |
| 2-(2-bromo-4-chlorophenoxy)ethanol | 151°–152° C. at 4.6 mm. pressure | 39.5–41.5 |
| 1-(4-bromophenoxy)-2-propanol | 129°–136° C. at 4 mm. pressure | |
| 1-(2-bromo-4-chlorophenoxy)-2-propanol | 149°–150° C. at 4.8 mm. pressure | |

The preparation of compounds of the invention by an alternative procedure is illustrated as follows: An aqueous solution of zinc chloride was added portionwise to an aqueous solution of potassium 1-(4-chlorophenoxy)-2-propylxanthate in the proportion of 1.25 mole of zinc chloride (ZnCl₂) for each 2 moles of the potassium xanthate compound. Following removal by evaporation of a portion of the water from the reaction mixture, zinc 1-(4-chlorophenoxy)-2-propylxanthate precipitated from solution and was separated. Zinc 1-(4-chlorophenoxy)-2-propylxanthate is a crystalline solid somewhat soluble in many organic solvents and water.

I claim:

1. A metal xanthate of a haloaryloxy lower alkanol, wherein the metal is selected from the group consisting of aluminum, copper, zinc, and the alkali and alkaline earth metals and halogen is selected from the group consisting of bromine and chlorine.

2. An alkali metal xanthate of a haloaryloxyalkanol, being characterized by the formula

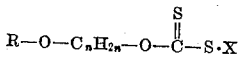

wherein $n$ represents one of the integers 2 and 3, X represents an alkali metal and R represents a haloaryl radical, and wherein the halogen is selected from the group consisting of bromine and chlorine.

3. An alkali metal xanthate of a chloroaryloxyalkanol, being characterized by the formula

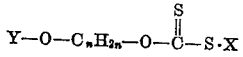

wherein $n$ represents one of the integers 2 and 3, X represents an alkali metal and Y represents a chlorophenyl radical.

4. An alkali metal xanthate of a chloroaryloxyalkanol, being characterized by the formula

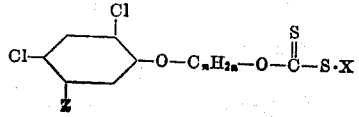

wherein $n$ represents one of the integers 2 and 3, X represents an alkali metal and Z represents a member of the group consisting of chlorine and hydrogen.

5. An alkali metal xanthate of a 2-methyl-4-chlorophenoxyalkanol, being characterized by the formula

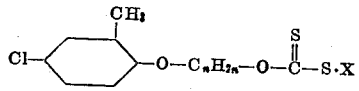

where $n$ represents one of the integers 2 and 3 and X represents an alkali metal.

6. An alkali metal xanthate of 2,4-dichlorophenoxyethanol, being characterized by the formula

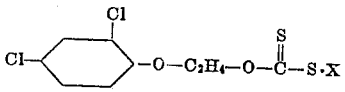

wherein X represents an alkali metal.

7. Potassium 2-(2,4-dichlorophenoxy)ethylxanthate.

8. Potassium 1-(4-chlorophenoxy)-2-propylxanthate.

9. Potassium 1-(4-chloro-2-methylphenoxy)-2-propylxanthate.

10. Potassium 1-(2,4,5-trichlorophenoxy)-2-propylxanthate.

BRYANT CHARLES FISCHBACK.

References Cited in the file of this patent

UNITED STATES PATENTS

| Number | Name | Date |
|---|---|---|
| 2,173,383 | Carter | Sept. 19, 1939 |
| 2,519,780 | Morrill | Aug. 22, 1950 |
| 2,562,011 | Baumgartner | July 24, 1951 |